J. TARTAGLIONE.
SHUTTLE.
APPLICATION FILED DEC. 8, 1916.

1,254,169.

Patented Jan. 22, 1918.

WITNESSES:

Joseph Tartaglione
INVENTOR.
BY John F. Kerr
ATTORNEY

UNITED STATES PATENT OFFICE.

JOSEPH TARTAGLIONE, OF PATERSON, NEW JERSEY.

SHUTTLE.

1,254,169.  Specification of Letters Patent.  Patented Jan. 22, 1918.

Application filed December 8, 1916. Serial No. 135,724.

*To all whom it may concern:*

Be it known that I, JOSEPH TARTAGLIONE, a subject of Victor Emanuel, King of Italy, residing at Paterson, in the county of Passaic and State of New Jersey, have invented certain new and useful Improvements in Shuttles, of which the following is a specification, reference being had therein to the accompanying drawing.

The objects of my invention are to provide a novel and useful bobbin or quill holder for shuttles, that will be equally adapted either for a wooden bobbin or a paper quill upon which the silk is wound in cop form; which, from its novel construction, will prevent the cop or quill from slipping on the spindle or quill holder and will prevent the silk thread from interfering with other parts of the shuttle while being delivered from the cop; to provide a shuttle with a quill holding spindle and block adapted to be screwed together, the block being provided with a screw threaded recess adapted to receive the screw threaded end of any kind of a spindle; to provide a shuttle with a two part quill holder having devices of novel construction for preventing the quill from slipping on the quill holder or spindle; to provide a quill holder having inside and outside spring means for engaging and holding a quill and preventing it from moving on the spindle; to provide a quill holder for shuttles having means for engaging a paper quill internally and means for engaging it externally to prevent accidental disengagement from the spindle or quill holder; to provide in a shuttle a spring actuated lever-block provided with a threaded recess adapted to receive any kind of spindle or quill holder and to provide a shuttle with non-slip quill-holding devices adapted to engage the quill internally and externally.

The invention consists of a spring actuated lever block and quill spindle of novel construction, a spring hook adapted to engage the outside of the quill and an expansion spring adapted to engage the inside of the quill substantially as illustrated in the accompanying drawings, in which similar letters of reference indicate like parts.

Figure 2:
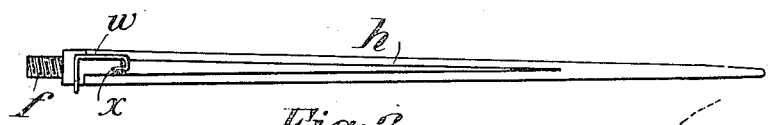
Figure 10:
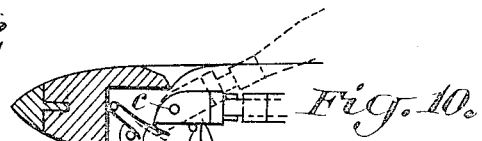
Figure 3:
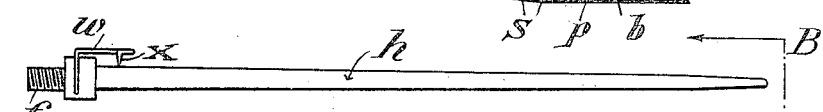
Figure 4:
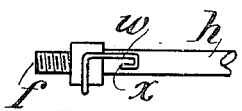
Figure 5:
Figure 9:
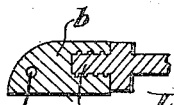
Figure 6:
Figure 7:
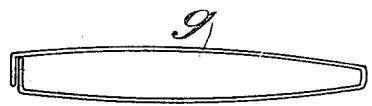
Figure 8:
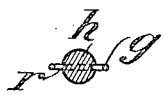
Figure 1:
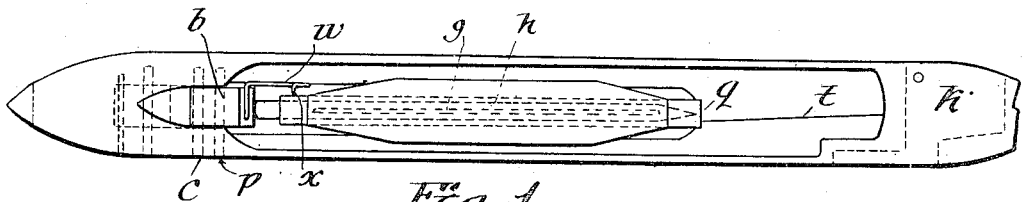

In the drawings, Figure 1 is a plan view of top of shuttle showing the pivotal block, spindle screwed therein, loaded quill on spindle and spring pin-hook secured to square shoulder on spindle, and the pin hook engaging the quill, spring bow line indicated by dotted line; Fig. 2 shows a modified form of spindle having a screw threaded end and shoulder upon which the spring hook may be used; Fig. 3 is another form of spindle with screw threaded end and shoulder provided with a spring pin-hook; Fig. 4 is a top view of portion of spindle shown in Fig. 1 with spring pin-hook secured thereto; Fig. 5 is an end view of spindle and pin-hook shown in Fig. 1; Fig. 6 is a detached side view of spindle shown in Fig. 1; Fig. 7 is a detached view of expansion spring bow shown in Fig. 6; Fig. 8 is a sectional view of spindle and expansion spring on line E—E, showing longitudinal grooves in opposite sides of spindle; Fig. 9 is a sectional view showing screw-threaded socket in pivotal block with screw-threaded end of the spindle screwed therein, and Fig. 10 is a view of end of shuttle partly in section showing spring and lever block upon which it acts.

In the drawing K is an ordinary shuttle provided with the usual springs, pivot bar —c— and stop bar —p—. When a wooden bobbin or quill is used in a shuttle, the large or inner end of the bobbin is provided with an annular groove and two springs are secured to the shuttle, the ends of which are pressed over the end of the bobbin into the annular groove to prevent the bobbin from longitudinal movement on the spindle. When a paper quill is used, said last mentioned springs, are not needed, and are objectionable, as the silk or other thread on the paper quill is apt to catch on the said springs and break. It has been customary for that reason, either to provide other shuttles for paper quills or to press or bend back the said springs, so as not to interfere with the silk on the quills when paper ones are used. But by frequent bending of the springs, they break, and new ones must be provided. My invention obviates the necessity for using said springs, my spring pin hook serving to engage either wooden or paper quills on bobbins, without damage to the silk. When the silk on the quill or bobbin breaks the result is a smash, causing loss in time and material. It is obvious, therefore, that my shuttle is economical as well as useful.

The block —b— is pivotally mounted on the pivot —c— and is provided with a threaded socket, adapted to receive the screw threaded end —f— of the spindle —h—.

A spring —S— is suitably arranged in the shuttle body to act upon the block —b— so as to permit the block —b— and the spindle secured therein, to be held in a horizontal or vertical position as required for the purpose of changing the quills or bobbins, in which case the spindle has to be raised from its normal horizontal position to a vertical position and then lowered again to its horizontal or normal position.

The spindle —h— is provided with an enlarged or square shoulder portion, to which is secured the spring hook —w— which is provided with a downwardly extending pin point X, adapted to be pressed down and pierce the end of either the wooden bobbin or a paper quill to prevent the longitudinal movement or slipping of the bobbin or quill on a spindle.

A spring bow —g— is provided to coöperate with the spring —w— with its pin point X to hold either quill or bobbin in normal position on the spindle —h—.

As shown in the drawing the spindle —h— has two transverse openings y—y, through which the spring bow passes and, also is provided with two oppositely located longitudinal grooves —r—r— connecting the said transverse openings —y—y.

These co-acting means engaging simultaneously the wooden or paper bobbin or quill prevent the moving or slipping of the same on the spindle —h—.

Owing to the longitudinal grooves —r— on the spindle and the contraction and expansion quality of the spring bow —g— quills —q— of various sizes may be used.

The modification in construction of spindle shown in Fig. 2 consists of a two-piece spindle. The main portion of the spindle being bifurcated or V shape. The ends thereof fit on one end of a cross-shaped member and flush with a square shoulder portion. The other end of the cross shaped member being screw threaded and adapted to be screwed into the screw threaded socket of the pivotal block —b—. The square shoulder portion of said cross shaped member is adapted to hold the spring hook —w— with its downwardly projecting pin-point —X—.

The bifurcated or split form of the main portion of the spindle gives it a springy nature and permits the use of quills or bobbins varying in diameter.

Fig. 3 differs from Fig. 6 in that it has not the horizontal openings —y— nor the longitudinal grooves —r— and is not provided with the spring bow —g—.

With this description of my invention, what I claim is:

1. A shuttle body having a chambered portion, a spring actuated block pivotally secured therein, and provided with a threaded socket, in combination with a quill holder having a screw threaded end, an enlarged or shoulder portion near said end, a spring hook, one end of which is secured to said shoulder portion, its other or free end terminating in a pin hook, adapted to pierce the quill from the outside, and prevent it from slipping on the spindle.

2. In a shuttle, a quill holder having an enlarged or shoulder portion near its inner end, in combination with a wire spring, one end of which is secured to the shoulder portion and its other, or free end, terminating in a pin hook, adapted to pierce the quill from the outside and prevent it from slipping on the spindle.

3. A quill holder, having an enlarged or shoulder portion near its inner end, a wire spring, one end of which is secured to said shoulder, its free end, terminating in a pin hook, adapted to pierce the quill from the outside, said holder or spindle having two transverse openings therethrough, oppositely located longitudinal grooves connecting said openings and an expansion wire spring bow passing through said openings and opposite said grooves to engage the inside of the quill and co-act with the external spring pin hook to prevent the quill from slipping on the spindle.

4. A shuttle having a chambered portion therein, a spring actuated block pivotally secured in said chamber and provided with a threaded socket, adapted to receive the screw threaded end of a spindle, a spindle adapted to be screwed into the socket of said lever block and provided with an enlarged or shoulder portion near its inner end, in combination with a spring, one end of which is secured to said shoulder, its other or free end, terminating in a pin hook, adapted to pierce a quill from the outside and a spring suitably arranged in the shuttle body so as to permit said block and quill spindle to be held in a horizontal or vertical position within the shuttle as required.

5. A shuttle body having a chambered portion, a spring actuated block pivotally secured therein and provided with a threaded socket, adapted to receive a screw threaded end of a quill spindle, in combination with a quill spindle having a screw threaded end, an enlarged portion or shoulder near said end, a spring having one end secured to said shoulder and its free end terminating in a pin hook, adapted to pierce the outside of a quill, two transverse openings through the said spindle, longitudinal grooves connecting the said openings, an expansion bow passing through said openings, and along said longitudinal grooves, and a spring suitably arranged in the shuttle body to permit said block and quill spindle to be held in a horizontal or vertical position as required.

In testimony whereof I affix my signature in presence of two witnesses.

JOSEPH TARTAGLIONE.

Witnesses:
SEBASTIANO CRISTILLO,
JOHN F. KERR.

Copies of this patent may be obtained for five cents each, by addressing the "Commissioner of Patents, Washington, D. C."